US012756117B2

(12) United States Patent
Yoshida et al.

(10) Patent No.: US 12,756,117 B2
(45) Date of Patent: Oct. 6, 2026

(54) TERMINAL BLOCK

(71) Applicant: Honda Motor Co., Ltd., Tokyo (JP)

(72) Inventors: Yusuke Yoshida, Tokyo (JP); Yuki Makimura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 18/587,517

(22) Filed: Feb. 26, 2024

(65) Prior Publication Data

US 2024/0332834 A1 Oct. 3, 2024

(30) Foreign Application Priority Data

Mar. 27, 2023 (JP) ................................ 2023-050236

(51) Int. Cl.
*H01R 9/24* (2006.01)
*H02K 5/22* (2006.01)

(52) U.S. Cl.
CPC ........... *H01R 9/2466* (2013.01); *H02K 5/225* (2013.01); *H01R 2201/10* (2013.01); *H01R 2201/26* (2013.01)

(58) Field of Classification Search
CPC .............. H01R 9/2466; H01R 2201/10; H01R 2201/26; H01R 4/34; H01R 13/64; H01R 9/2416; H01R 9/18; H01R 9/223; H02K 5/225; H02K 13/00; B60L 15/20
See application file for complete search history.

(56) References Cited

U.S. PATENT DOCUMENTS 4,667,268 A 5/1987 Mrowka
7,591,660 B1 * 9/2009 Eichhorst ................ H01R 9/24 439/721
10,014,601 B1 * 7/2018 Nakazawa .......... H01M 50/507
11,489,270 B2 * 11/2022 Shimizu ................. H01R 9/223
2004/0185698 A1 * 9/2004 Hara ...................... H01R 9/226 439/212
2005/0094356 A1 * 5/2005 Onizuka ................ H05K 3/328 361/611
2013/0016455 A1 1/2013 Mooney et al.
2017/0104281 A1 * 4/2017 Kurono .................. H02K 3/522

(Continued)

FOREIGN PATENT DOCUMENTS

JP 2014143045 A 8/2014
JP 2022151138 A 10/2022

OTHER PUBLICATIONS

Japanese office action; Application 2023-050236; Nov. 12, 2024.

*Primary Examiner* — Abdullah A Riyami
*Assistant Examiner* — Nelson R. Burgos-Guntin
(74) *Attorney, Agent, or Firm* — Duft & Bornsen, PC

(57) ABSTRACT

A terminal block includes: a base plate; a first fixing portion arranged on the base plate, to which an end portion of a first bus bar is fixed; a first wall portion erected on the base plate and forming an extension path of the first bus bar; a second fixing portion arranged on the base plate side by side with the first fixing portion, to which an end portion of a second bus bar is fixed; and a second wall portion erected on the base plate and forming an extension path of the second bus bar. The first wall portion has a first interference region preventing arrangement of the second bus bar to the first fixing portion, and the second wall portion has a second interference region preventing arrangement of the first bus bar to the second fixing portion.

10 Claims, 11 Drawing Sheets

(56) References Cited

U.S. PATENT DOCUMENTS

| | | | | |
|---|---|---|---|---|
| 2019/0297720 | A1* | 9/2019 | Fujimura | H05K 1/0204 |
| 2021/0066985 | A1* | 3/2021 | Tanouchi | H02K 3/50 |
| 2021/0210876 | A1* | 7/2021 | Watanabe | H01R 9/223 |
| 2022/0037963 | A1* | 2/2022 | Zweigle | H02K 5/22 |
| 2022/0158519 | A1* | 5/2022 | Kuroyanagi | B60L 50/60 |
| 2022/0173641 | A1* | 6/2022 | Fujimoto | H02K 5/203 |
| 2022/0271628 | A1* | 8/2022 | Miki | H02K 11/25 |

* cited by examiner

TERMINAL BLOCK

CROSS-REFERENCE TO RELATED APPLICATION

This application is based upon and claims the benefit of priority from Japanese Patent Application No. 2023-050236 filed on Mar. 27, 2023, the content of which is incorporated herein by reference.

BACKGROUND OF THE INVENTION

Field of the Invention

The present invention relates to a terminal block.

Description of the Related Art

Electric vehicles, such as hybrid vehicles, are equipped with a drive device that has a rotary electric machine, such as an electric motor and a generator, and a control unit that controls the rotary electric machine. For example, JP 2022-151138 A describes a point where the rotary electric machine and the control unit are connected by a connecting wire called a bus bar.

In the drive device described in JP 2022-151138 A, the three bus bars are almost the same shape, but the shape of bus each bus bar may be different to avoid interference with surrounding components. For example, when two bus bars with different shapes, such as bus bar A and bus bar B, are used, there is a risk of incorrect assembly, in which busbar B is assembled to a terminal where busbar A should be assembled.

SUMMARY OF THE INVENTION

An aspect of the present invention is a terminal block including: a base plate; a first fixing portion arranged on the base plate, to which an end portion of a first bus bar is fixed; a first wall portion erected on the base plate and forming an extension path of the first bus bar; a second fixing portion arranged on the base plate side by side with the first fixing portion, to which an end portion of a second bus bar is fixed; and a second wall portion erected on the base plate and forming an extension path of the second bus bar. The first wall portion has a first interference region preventing arrangement of the second bus bar to the first fixing portion, and the second wall portion has a second interference region preventing arrangement of the first bus bar to the second fixing portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the invention will be described with reference to FIGS. 1 to 11. For convenience, the front-rear, left-right, and up-down directions are defined below, as shown in the figure, and the configuration of each part is described according to these definitions. The downward direction in the up-down direction is the direction of gravity. The front-rear and left-right directions do not necessarily correspond to the front-rear and left-right directions of the object of application (e.g., vehicle).

Figure 1:
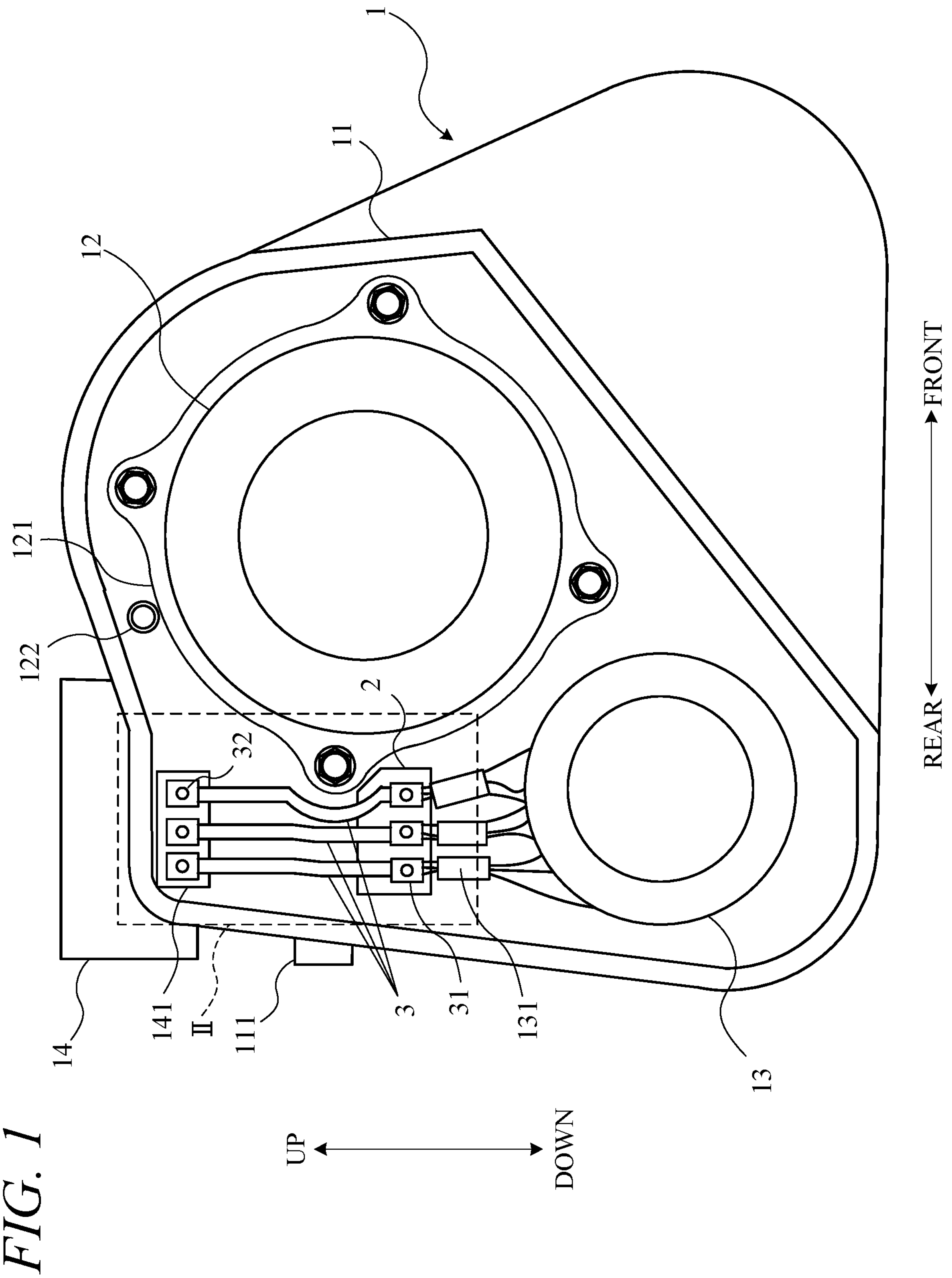
FIG. 1 is a view illustrating an overview of a traction motor unit to which a terminal block according to an embodiment of the present invention is applied.

FIG. 1 is a view illustrating an overview of a traction motor unit 1 to which a terminal block according to an embodiment of the present invention is applied. As illustrated in FIG. 1, a traction motor 12, a generator 13, a transmission (not illustrated), and the like are provided in a transmission case 11 of the traction motor unit 1. A power control unit (PCU) 14 including an inverter and the like is provided on the upper part of the transmission case 11. The rotary shafts of the traction motor 12 and the generator 13 extend in a right-left direction.

FIG. 1 illustrates a state where the right lid of the transmission case 11 is removed, and the traction motor 12, the generator 13, and a terminal block (hereinafter, referred to as an intermediate terminal block) 2 are exposed. The intermediate terminal block 2 is a terminal block for connecting a generator feed 131 pulled out from the generator stator and a bus bar 3. A connection terminal of the generator feed 131 and a terminal portion 31 provided at one end of the bus bar 3 are fixed to the intermediate terminal block 2. The terminal portion 32 provided at the other end of the bus bar 3 is connected to a PCU terminal 141.

The transmission case 11 is provided with a coolant introduction port 111 through which a coolant liquid is introduced. The three-phase current generated by the generator 13 is input to the PCU 14 via three bus bars 3. A dropping pipe 122 for dropping an automatic transmission fluid (ATF) is provided in the vicinity of a stator 121 of the traction motor 12. By dropping the ATF from the dropping pipe 122, the ATF is supplied to the entire stator 121.

Figure 2:
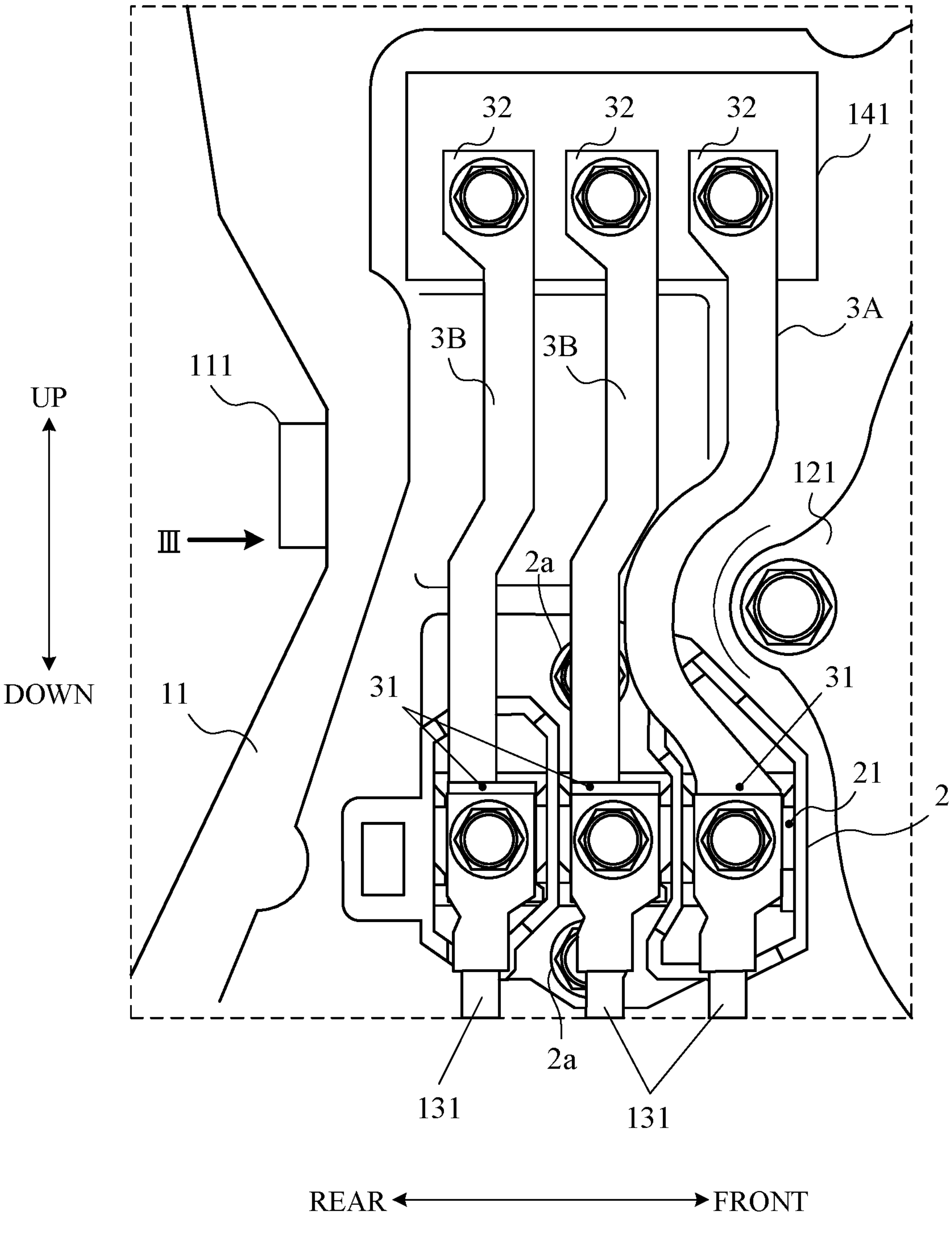
FIG. 2 is an enlarged view of a portion II in FIG. 1.

FIG. 2 is an enlarged view of a portion II (rectangular broken line region) in FIG. 1. As illustrated in FIG. 2, the bus bar 3 includes a bus bar 3A and two bus bars 3B having the same shape as each other. The bus bar 3A is formed to be curved rearward between the terminal portion 31 and the terminal portion 32. That is, a part of the stator 121 of the traction motor 12 protrudes rearward, and the bus bar 3A has a curved shape so as not to interfere with the protruding portion. Accordingly, the bus bar 3B is also bent rearward between the terminal portion 31 and the terminal portion 32 so as not to interfere with the bus bar 3A.

The bottom surface of the intermediate terminal block 2 is fixed to the vertical surface at the right end of the transmission case 11 by two upper and lower bolts 2*a*. The terminal portion 31 of each of the bus bars 3A and 3B is arranged on a fixing portion 21 of the intermediate terminal block 2 so as to overlap with the connection terminal of the corresponding generator feed 131. The generator feed 131 and the terminal portion 31 are fastened together with a bolt and fixed to the fixing portion 21.

Figure 3:
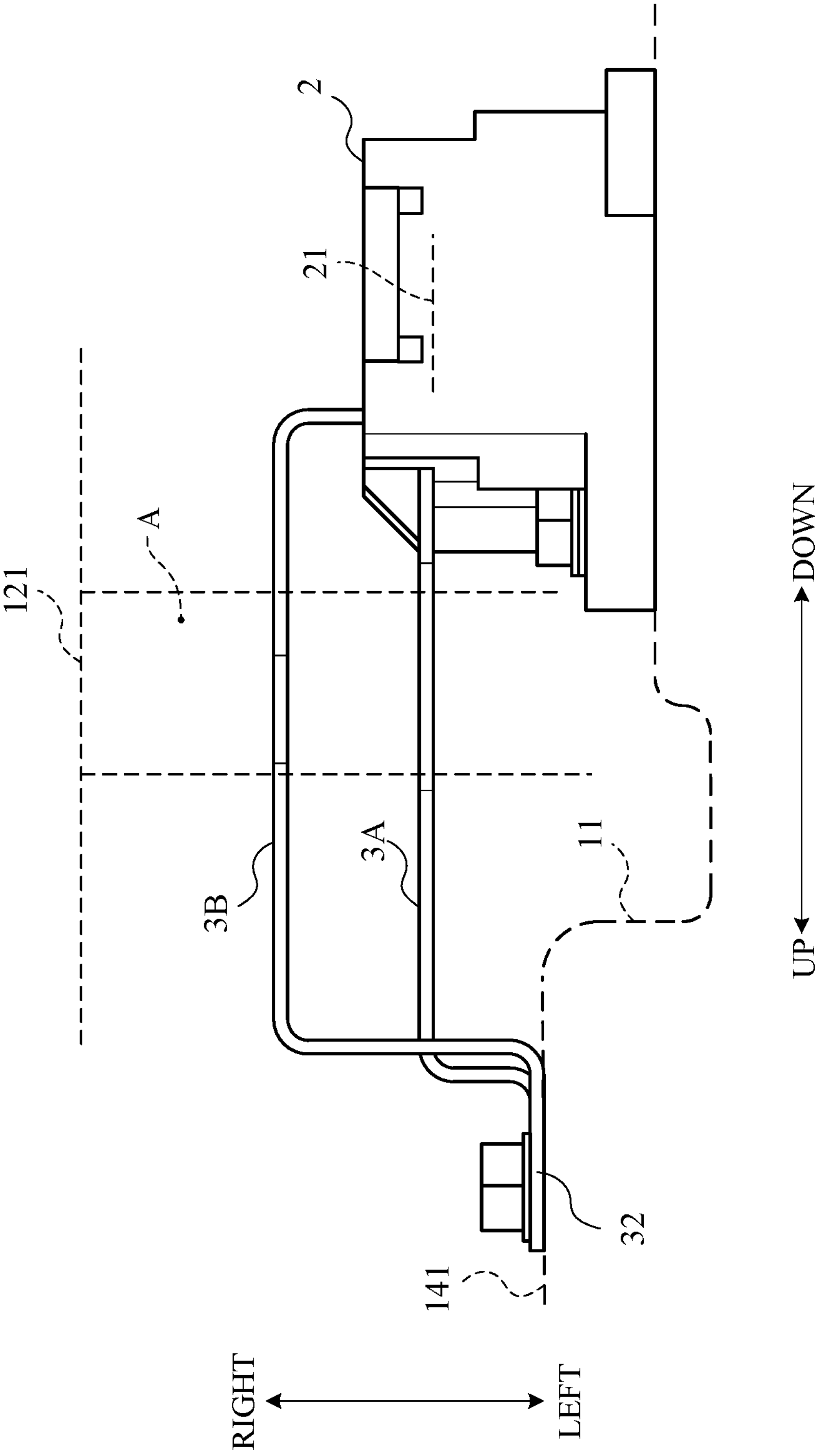
FIG. 3 is a view on arrow III.

FIG. 3 is a view on arrow III (a view seen from the rear) in FIG. 2. As illustrated in FIG. 3, the right end surface of the transmission case 11 has a step, and the surface to which the intermediate terminal block 2 is fixed and the bus bar fixing surface of the PCU terminal 141 have different heights (positions in the right-left direction). Similarly to the bus bars 3A and 3B, the stator 121 provided in the transmission case 11 is formed so as to protrude to the right side. A region A of the stator 121 in FIG. 3 is a region (see FIG. 2) where the stator 121 protrudes rearward toward the bus bar 3A.

The bus bar 3A is bent rightward below the terminal portion 32 fixed to the PCU terminal 141, rises to the same height as the height of the fixing portion 21 of the intermediate terminal block 2, and then is bent downward. Further, the bus bar 3A extends downward toward the intermediate terminal block 2 and is fixed to the fixing portion 21. The bus bar 3B is bent rightward below the terminal portion 32, rises rightward with respect to the intermediate terminal block 2, and then is bent downward. Further, the bus bar 3B extends downward toward the intermediate terminal block 2, is bent leftward in the vicinity of the intermediate terminal block 2, is then bent downward along the fixing portion 21, and is fixed to the fixing portion 21. The bus bar 3B protrudes rightward with respect to the bus bar 3A and extends on the right side with respect to the bus bar 3A in the up-down direction. Therefore, in FIG. 2, the curved portion of the bus bar 3A appears to be close to the rear bus bar 3B, but is sufficiently separated in the right-left direction.

Figure 4:
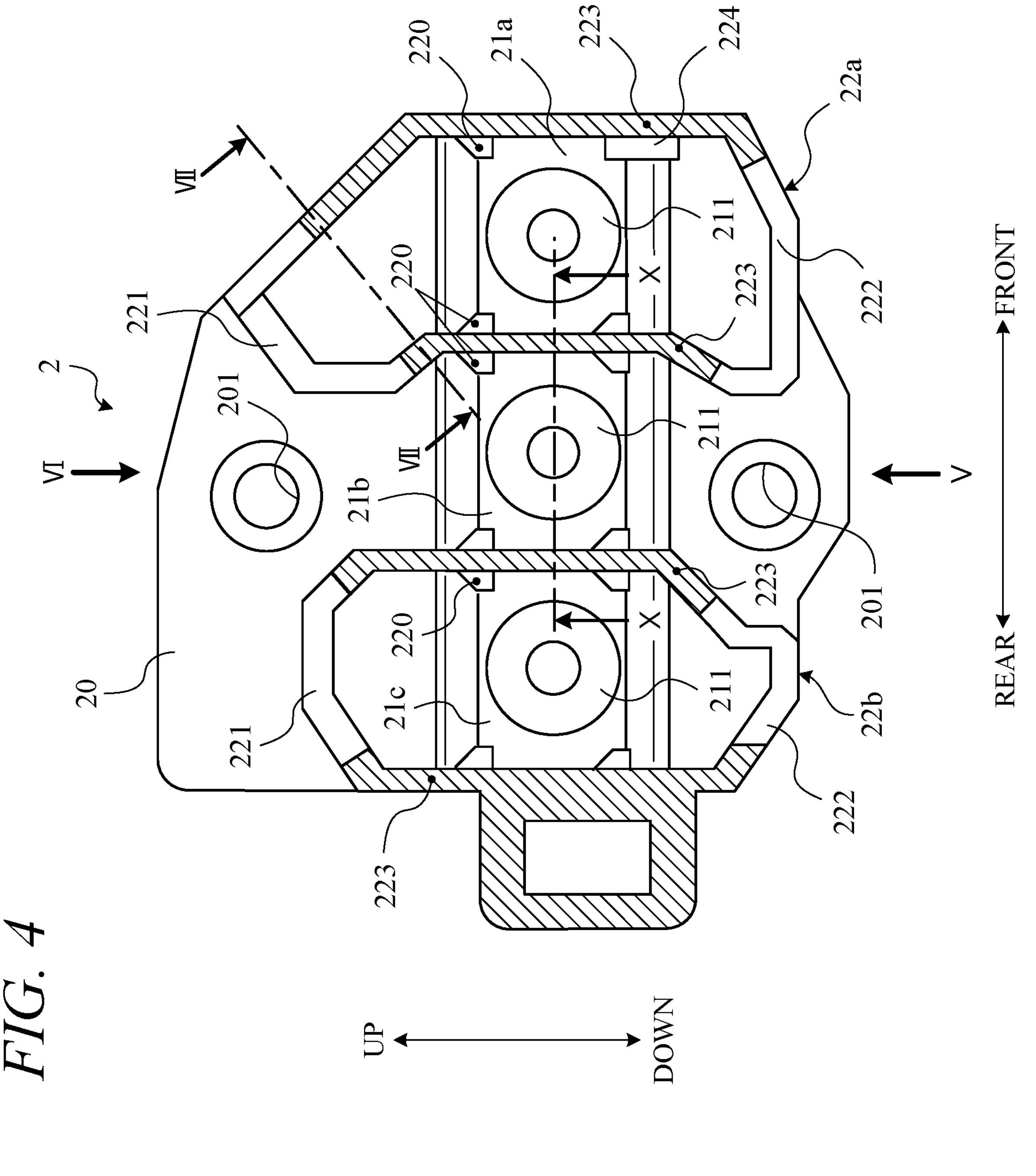
FIG. 4 is a plan view of the intermediate terminal block in FIG. 2.
Figure 5:
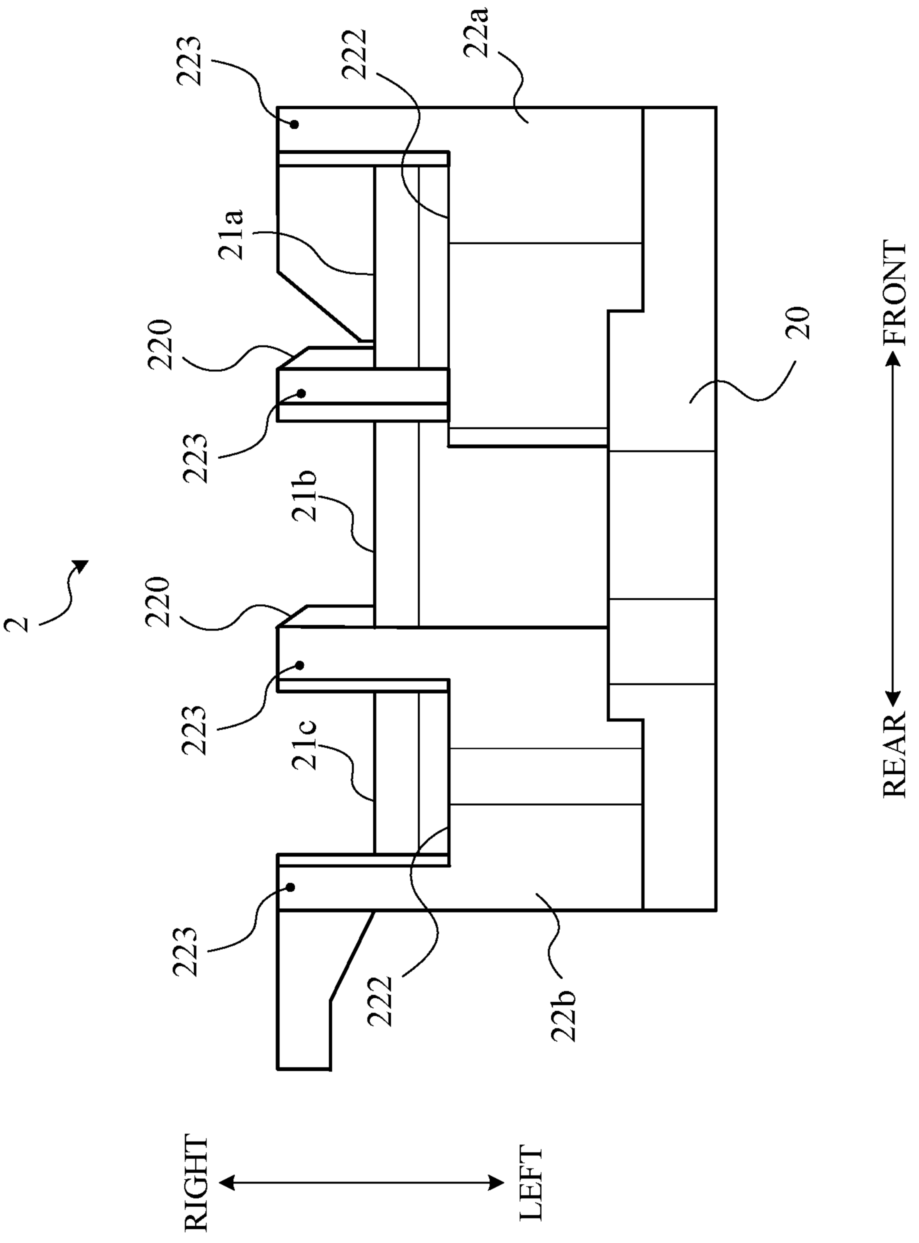
FIG. 5 is a view on arrow V in FIG. 4.
Figure 6:
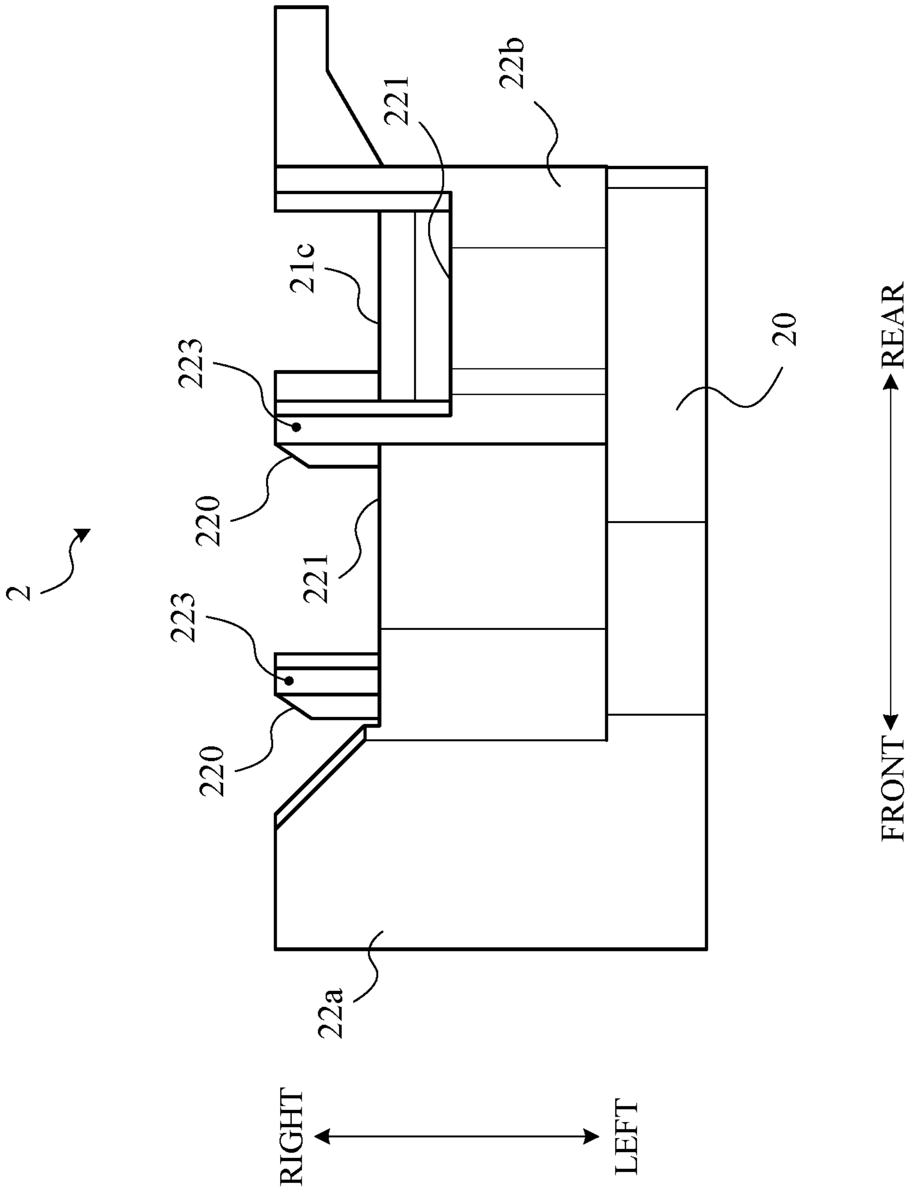
FIG. 6 is a view on arrow VI in FIG. 4.

FIG. 4 is a plan view (a view seen from the right side) of the intermediate terminal block 2 alone, FIG. 5 is a view on arrow V in FIG. 4 (a view seen from the lower side), and FIG. 6 is a view on arrow VI in FIG. 4 (a view seen from the upper side). Also in FIGS. 4 to 6, a front-rear direction, the right-left direction, and the up-down direction are shown with reference to the attached state of the intermediate terminal block 2. The intermediate terminal block 2 is formed by insert molding in which a metal plate is molded with an electrically insulating resin.

As illustrated in FIGS. 4 to 6, the intermediate terminal block 2 includes a base portion 20 fixed to the transmission case 11 which is an attachment target, three fixing portions 21*a*, 21*b*, and 21*c* provided in the base portion 20, and wall portions 22*a* and 22*b* provided around the fixing portions 21*a*, 21*b*, and 21*c*. The base portion 20 is provided with a through hole 201 through which a bolt 2*a* (FIG. 2) for fixing the intermediate terminal block 2 to an attachment target is inserted.

The fixing portions 21*a*, 21*b*, and 21*c* are arranged side by side on the surface (right surface) of the base portion 20 in the front-rear direction, and the surfaces of the fixing portions are provided with seating surfaces 211 to which the terminal portions 31 of the bus bars 3A and 3B are fixed. The terminal portion 31 of the bus bar 3A is fixed to the seating surface 211 of the front fixing portion 21*a*, and the terminal portions 31 of two bus bars 3B are fixed to the seating surfaces 211 of two rear fixing portions 21*b* and 21*c*.

The wall portions 22*a* and 22*b* is provided to protrude rightward from the base portion 20. The front wall portion 22*a* is formed so as to surround the fixing portion 21*a* positioned at the foremost part, and the rear wall portion 22*b* is formed so as to surround the fixing portion 21*c* positioned at the rearmost part. More specifically, the wall portions 22*a* and 22*b* protrude upward and downward with respect to the fixing portions 21*a* and 21*c* and extend in an elongated shape in the up-down direction.

A part indicated by hatching in FIG. 4 is a region where the amount of protrusion to the right increases. Hereinafter, a portion of the wall portions 22*a* and 22*b* indicated by hatching is referred to as a partition wall portion 223. There are four partition wall portions 223 in the front-rear direction. The fixing portions 21*a*, 21*b*, and 21*c* are provided between the four partition wall portions 223, respectively.

On the side surfaces (front surface and rear surface) of the partition wall portion 223, guide portions 220 for guiding the bus bars 3A and 3B to the fixing portions 21*a* to 21*c* are provided to protrude toward the fixing portions 21*a* to 21*c*. On the rear surface of the partition wall portion 223 positioned at the front end, an erroneous assembly prevention portion 224 for preventing the bus bar 3B from being erroneously assembled to the fixing portion 21*a* is provided to protrude toward the fixing portion 21*a*. The configurations of the guide portion 220 and the erroneous assembly prevention portion 224 will be described later.

Pull-out ports 221 for pulling out the bus bars 3A and 3B, which are fixed to the fixing portions 21*a* and 21*c*, upward are provided in the upper regions of the wall portions 22*a* and 22*b*. Pull-out ports 222 for pulling out the generator feeds 131, which are fixed to the fixing portions 21*a* and 21*c*, downward are provided in the lower regions of the wall portions 22*a* and 22*b*. These pull-out ports 221 and 222 are formed by cutting out a part of the wall portions 22*a* and 22*b*. Therefore, the heights (rightward protrusion amount) of the pull-out ports 221 and 222 are lower than the height of the partition wall portion 223.

The height of the pull-out port 221 is set to be substantially the same as the height of the fixing portion 21*a* (see FIG. 6). Therefore, the pull-out port 221 of the wall portion 22*a* functions as a support portion 221*a* which supports an extension portion 33 (FIG. 9) of the bus bar 3A. The support portion 221*a* is provided continuously with the partition wall portion 223. Since the bus bar 3A arranged on the fixing portion 21*a* is mounted on both surfaces of the fixing portion 21*a* and the pull-out port 221, the bus bar 3A can be stably held during the assembling work of the bus bar 3A.

The partition wall portions 223 arranged on both front and rear sides of the fixing portion 21*a* form groove-shaped paths (hereinafter, referred to as extension paths) extending in the up-down direction with respect to the bus bar 3A fixed to the fixing portion 21*a*. The partition wall portions 223 arranged on both front and rear sides of the fixing portion 21*b* form a groove-shaped extension path extending in the up-down direction with respect to the bus bar 3B fixed to the fixing portion 21*b*. The partition wall portions 223 arranged on both front and rear sides of the fixing portion 21*c* form a groove-shaped extension path extending in the up-down direction with respect to the bus bar 3B fixed to the fixing portion 21*c*.

The intermediate terminal block 2 of the present embodiment includes the wall portions 22*a* and 22*b* to have various functions. This point will be described below.

First Function: Improvement in Insulation Performance

Figure 7:
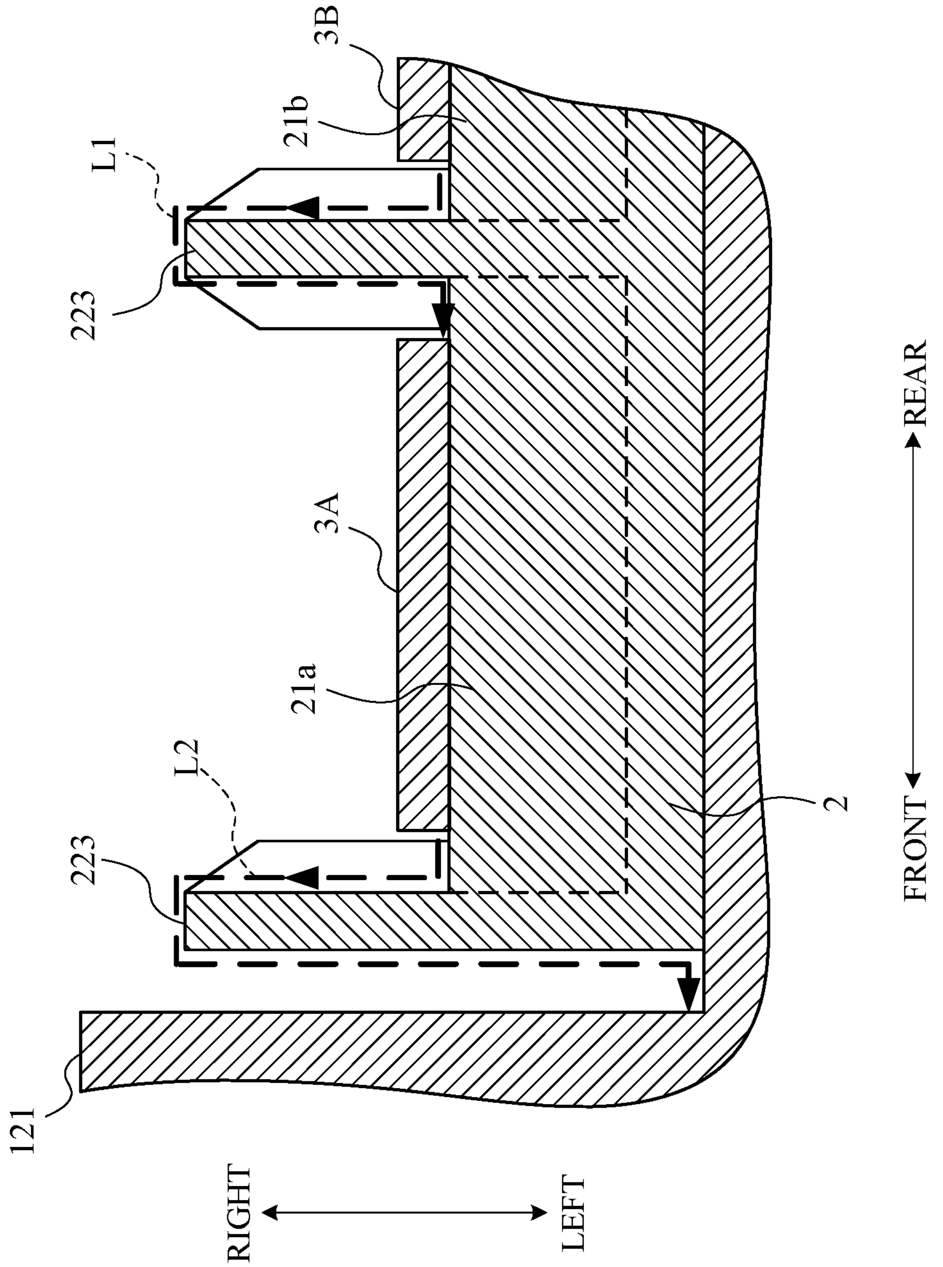
FIG. 7 is a cross-sectional view taken along line VII-VII of FIG. 4.

First, the partition wall portions 223 of the wall portions 22*a* and 22*b* function as insulating protection walls for the bus bars 3A and 3B and the generator feeds 131 fixed to the fixing portions 21*a* to 21*c*. FIG. 7 is a cross-sectional view taken along line VII-VII of FIG. 4, and is a view for explaining a creeping discharge suppression function. The creeping discharge is a discharge phenomenon in which a current flows along the surface of an insulating material.

Although not illustrated in FIG. 4, the bus bars 3A and 3B are fixed to the fixing portions 21*a* and 21*b* configured of an insulating material as illustrated in FIG. 7.

In this case, there is a possibility of creeping discharge between the bus bar 3A and the bus bar 3B and between the bus bar 3A and the stator 121. However, in the intermediate terminal block 2, the partition wall portion 223 having a large height dimension is interposed therebetween. The protrusion height of the partition wall portion 223 from the base portion 20 is set higher than the heights of the bus bars 3A and 3B fixed to the fixing portions 21*a*, 21*b*, and 21*c*. Therefore, the current of the creeping discharge flows through paths as indicated by broken line arrows L1 and L2. The lengths of the paths indicated by the broken line arrows L1 and L2 represent an insulation distance in the creeping discharge, and by providing the partition wall portion 223, the insulation distance can be enlarged several times as compared with the case where the partition wall portion 223 is not provided. As a result, the occurrence of creeping discharge can be suppressed.

Second Function: Erroneous Assembly Preventing Function

Figure 8:
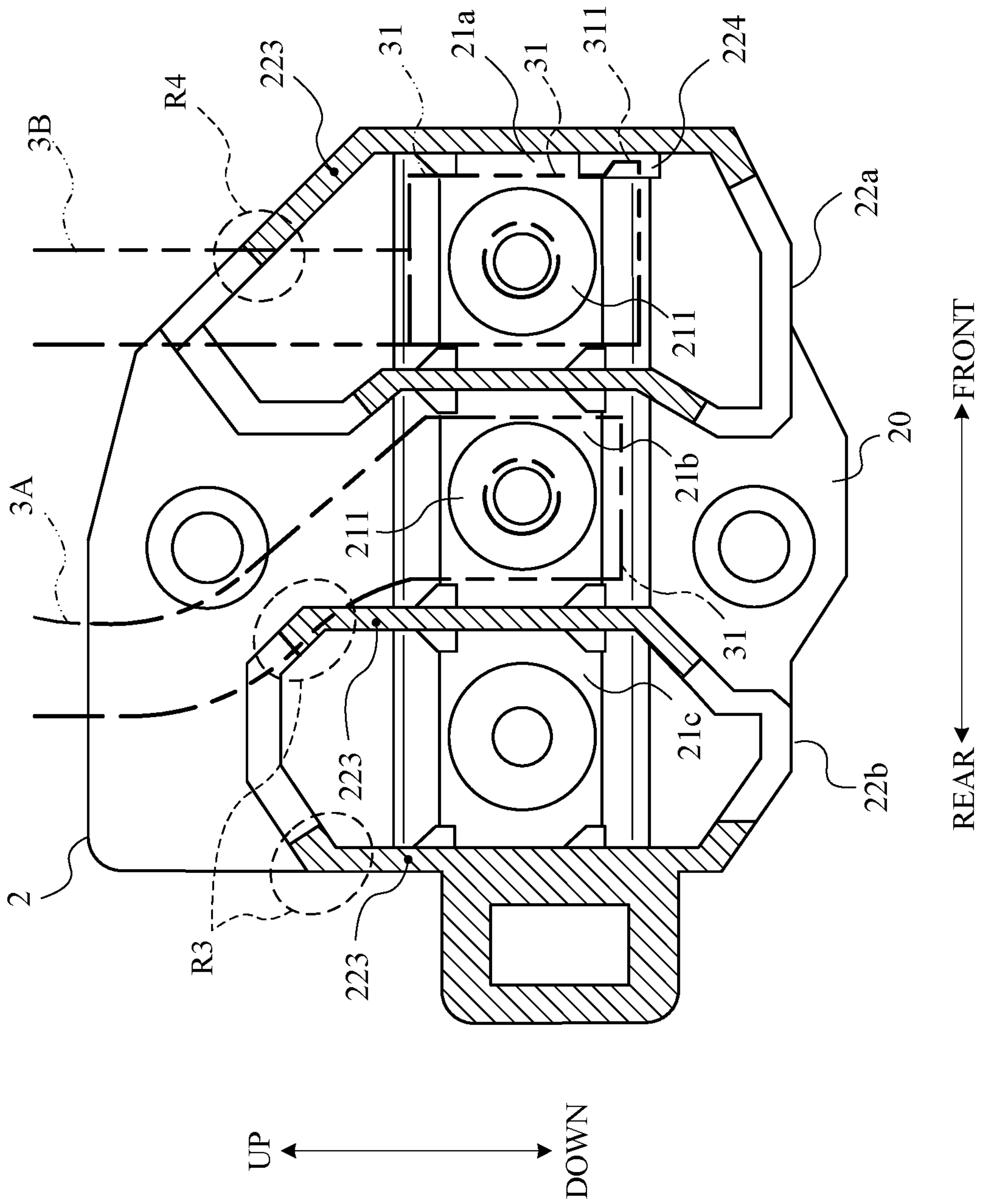
FIG. 8 is a view for explaining an erroneous assembly preventing function.
Figure 9:
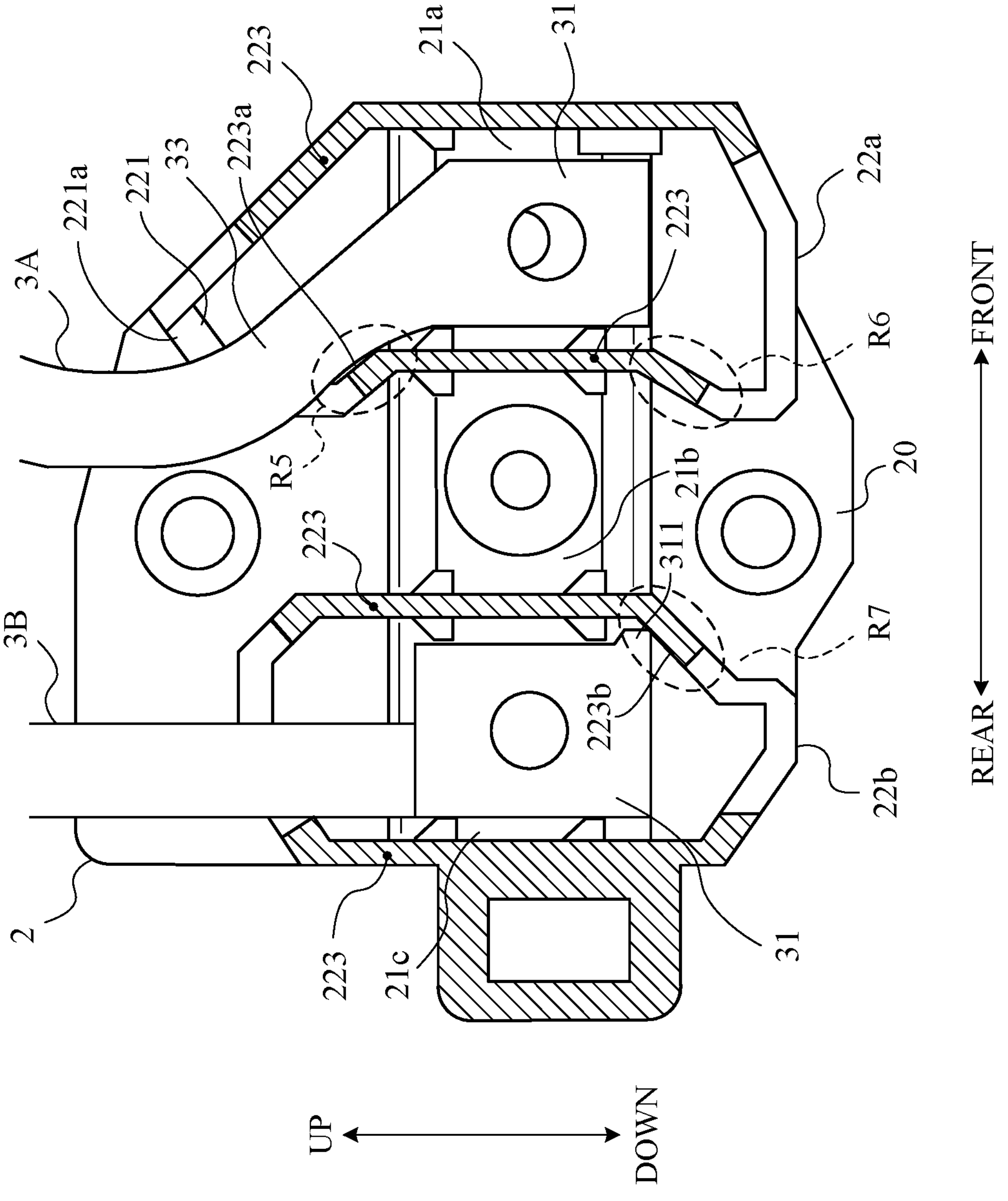
FIG. 9 is a view for explaining a fall preventing function.

The second function of the wall portions 22*a* and 22*b* is an erroneous assembly preventing function of the bus bars 3A and 3B. FIG. 8 is a view for explaining an erroneous assembly preventing function of the intermediate terminal block 2. As illustrated in FIG. 8, the erroneous assembly prevention portion 224 protruding rearward is formed on the inner peripheral surface (the rear surface of the front partition wall portion 223) of the wall portion 22*a* (partition wall portion 223) surrounding the fixing portion 21*a*. The bus bar 3A is fixed to the fixing portion 21*a*, and the bus bar 3B is fixed to the fixing portions 21*b* and 21*c*, but the bus bar 3A and the bus bar 3B have different shapes (see FIGS. 2 and 3). That is, the bus bar 3A is largely curved rearward in order to avoid interference with the stator 121. In addition, as illustrated in FIG. 9, a protrusion 311 for preventing erroneous assembly is provided in the terminal portion 31 of the bus bar 3B to protrude forward.

When the bus bar 3A is erroneously assembled to the fixing portion 21*b* as indicated by a two-dot chain line in FIG. 8, the curved portion of the bus bar 3A interferes with the front partition wall portion 223 of the wall portion 22*b* in the region denoted by reference numeral R3. Similarly, when the bus bar 3A is erroneously assembled to the fixing portion 21*c*, the curved portion of the bus bar 3A interferes with the rear partition wall portion 223 (the region denoted by reference numeral R3) of the wall portion 22*b*. Therefore, the terminal portion 31 of the bus bar 3A cannot be arranged on the seating surfaces 211 of the fixing portions 21*b* and 21*c*, and erroneous assembly of the bus bar 3A to the fixing portions 21*b* and 21*c* can be prevented.

When attempting to assemble the bus bar 3B to the fixing portion 21*a* as indicated by the two-dot chain line, the protrusion 311 formed on the terminal portion 31 of the bus bar 3B interferes with the erroneous assembly prevention portion 224 formed on the inner peripheral surface of the wall portion 22*a*. Further, since the bus bar 3B is not greatly curved like the bus bar 3A, the bus bar 3B interferes with the partition wall portion 223 of the wall portion 22*a* in the region denoted by reference numeral R4. As a result, the terminal portion 31 of the bus bar 3B cannot be arranged on the seating surface 211 of the fixing portion 21*a*, and erroneous assembly of the bus bar 3B to the fixing portion 21*a* can be prevented.

Third Function: Fall Preventing Function

A third function of the wall portions 22*a* and 22*b* is to prevent the bus bars 3A and 3B from falling during assembling work. FIG. 9 is a view for explaining a fall preventing function of the intermediate terminal block 2. An attachment work of the bus bars 3A and 3B is performed after the intermediate terminal block 2 is fixed to the transmission case 11. In this case, since the bus bars 3A and 3B are arranged in the up-down direction, there is a possibility that the bus bars 3A and 3B are fallen during the attachment work, and the fixing work may take time. In addition, in the case of a work process of temporarily placing the bus bars 3A and 3B on the intermediate terminal block 2 and performing screwing in a next process, when the traction motor unit 1 is moved to the location of the next process, the bus bars 3A and 3B may be fall from the temporarily placed intermediate terminal block 2.

FIG. 9 illustrates an aspect in which the temporarily placed bus bars 3A and 3B are prevented from falling. The bus bar 3A has an extension portion 33 which extends vertically upward while being curved from the terminal portion 31. A pair of partition wall portions 223 of the wall portions 22*a* form an extension path through which the extension portion 33 of the bus bar 3A passes. The extension path extends above the rear partition wall portion 223 of the wall portion 22*a*. Therefore, when the bus bar 3A temporarily placed on the fixing portion 21*a* is displaced downward as illustrated in the drawing, the extension portion 33 abuts on the partition wall portion 223 in the region indicated by reference numeral R5. That is, the extension portion 33 abuts on the wall portion 223*a* provided above the terminal portion 21*a* so as to cross the extension path. As a result, the displaced bus bar 3A is held in the state illustrated in FIG. 9 by the partition wall portion 223, and is prevented from falling.

The inner peripheral surface (rear surface) of the front partition wall portion 223 of the wall portion 22*b* obliquely extends toward the lower side and the rear side of the fixing portion 21*c* in the region indicated by reference numeral R7. Therefore, when the bus bar 3B is displaced downward from the fixing portion 21*c* as illustrated, the terminal portion 31 of the bus bar 3B abuts on the inner peripheral surface of the partition wall portion 223 in the region indicated by reference numeral R7. That is, the bus bar 3B abuts on the wall portion 223*b* protruding toward an extension flow path below the fixing portion 21*c*. As a result, the displaced bus bar 3B is held in the state illustrated in FIG. 9, and the bus bar 3B is prevented from falling. Similarly, with respect to the bus bar 3B fixed to the fixing portion 21*b*, the terminal portion 31 abuts on the outer peripheral surface (a surface on the fixing portion 21*b* side) of the rear partition wall portion 223 of the wall portion 22*a* in the region indicated by reference numeral R6, and thus the bus bar 3B is prevented from falling. Since the protrusion 311 is formed in the terminal portion 31 of the bus bar 3B, the amount of displacement until the terminal portion 31 abuts on the partition wall portion 223 can be suppressed to be small. In order to prevent the bus bar 3A from falling, a wall portion similar to the wall portion 223*b* protruding toward the extension flow path may be provided below the fixing portion 21*a*. In order to prevent the bus bar 3B from falling, a wall portion similar to the wall portion 223*a* may be provided above the fixing portion 21*c* so as to cross the extension path.

Fourth Function: Positioning Function

Figure 10:
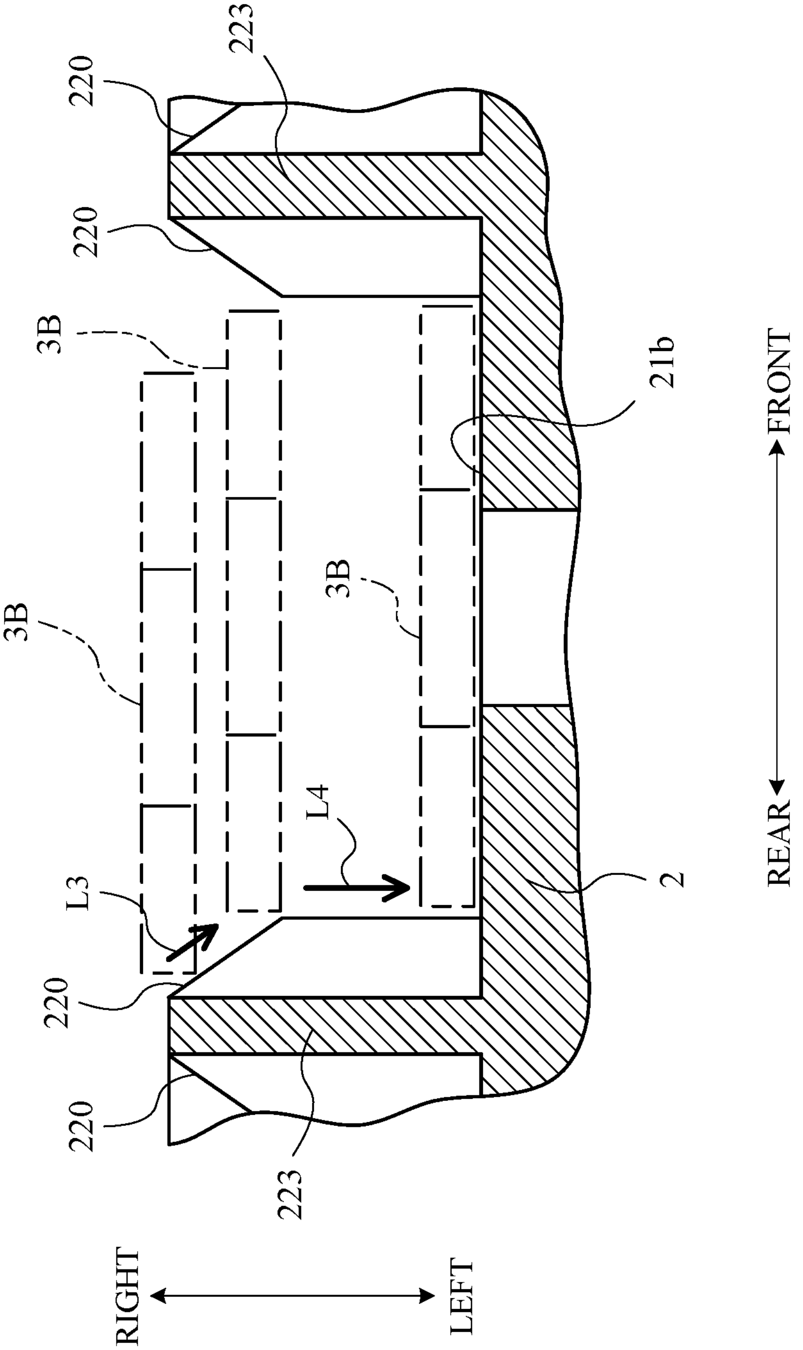
FIG. 10 is a cross-sectional view taken along line X-X in FIG. 4.

FIG. 10 is a view for explaining a positioning function with respect to the bus bars 3A and 3B, which is a fourth function of the wall portions 22*a* and 22*b*. FIG. 10 corresponds to a cross-sectional portion taken along line X-X in FIG. 4. In FIG. 10, an operation of positioning the bus bar 3B fixed to the fixing portion 21*b* is mainly illustrated. As illustrated in FIG. 4, the guide portions 220 for guiding the bus bars 3A and 3B to the fixing portions 21*a* to 21*c* are provided on front and rear surfaces of the wall portions 22*a* and 22*b*. As illustrated in FIG. 10, the front guide portion 220 of the fixing portion 21*b* has an inclined surface inclined rearward and leftward. The rear guide portion 220 of the fixing portion 21*b* has an inclined surface inclined forward and leftward. The guide portions 220 on both front and rear sides of the fixing portions 21*a* and 21*c* in FIG. 4 similarly have inclined surfaces.

In FIG. 10, each of two-dot chain lines indicates the position of the bus bar 3B in the middle of arranging the bus bar 3B at the fixing portion 21*b*. When the bus bar 3B abuts on the rear guide portion (inclined surface) 220, as indicated by a solid arrow L3, the bus bar 3B is guided to the front side, which is the center of the fixing portion 21*b*, by the guide portion 220 which is an inclined surface. When the bus bar 3B is guided to the center of the fixing portion, the bus bar 3B moves leftward as indicated by a solid arrow L4 and is placed at the center position on the fixing portion 21*b*. The connection terminal of the generator feed 131 fixed to the fixing portion 21*b* is also guided to the center of the fixing portion 21*b* by the guide portion 220 similarly to the case of the bus bar 3B.

FIG. 10 illustrates the positioning operation (guiding operation) in a case where the bus bar 3B is displaced to the rear side, but in a case where the bus bar 3B is displaced to the front side, the bus bar 3B is guided rearward and leftward obliquely toward the center of the fixing portion 21*b* by the front guide portion 220. The guide portions 220 of the other fixing portions 21*a* and 21*c* also function similarly to the case of the fixing portion 21*b*. In the present embodiment, the guide portion 220 is provided on both front and rear sides of the fixing portions 21*a* to 21*c*, but the guide portion 220 may be provided only on one side. In this case, by arranging the bus bars 3A and 3B in the fixing portions 21*a* to 21*c* along the guide portion 220, the guide function of the guide portion 220 can be used.

Fifth Function: Deposition Preventing Function

Figure 11:
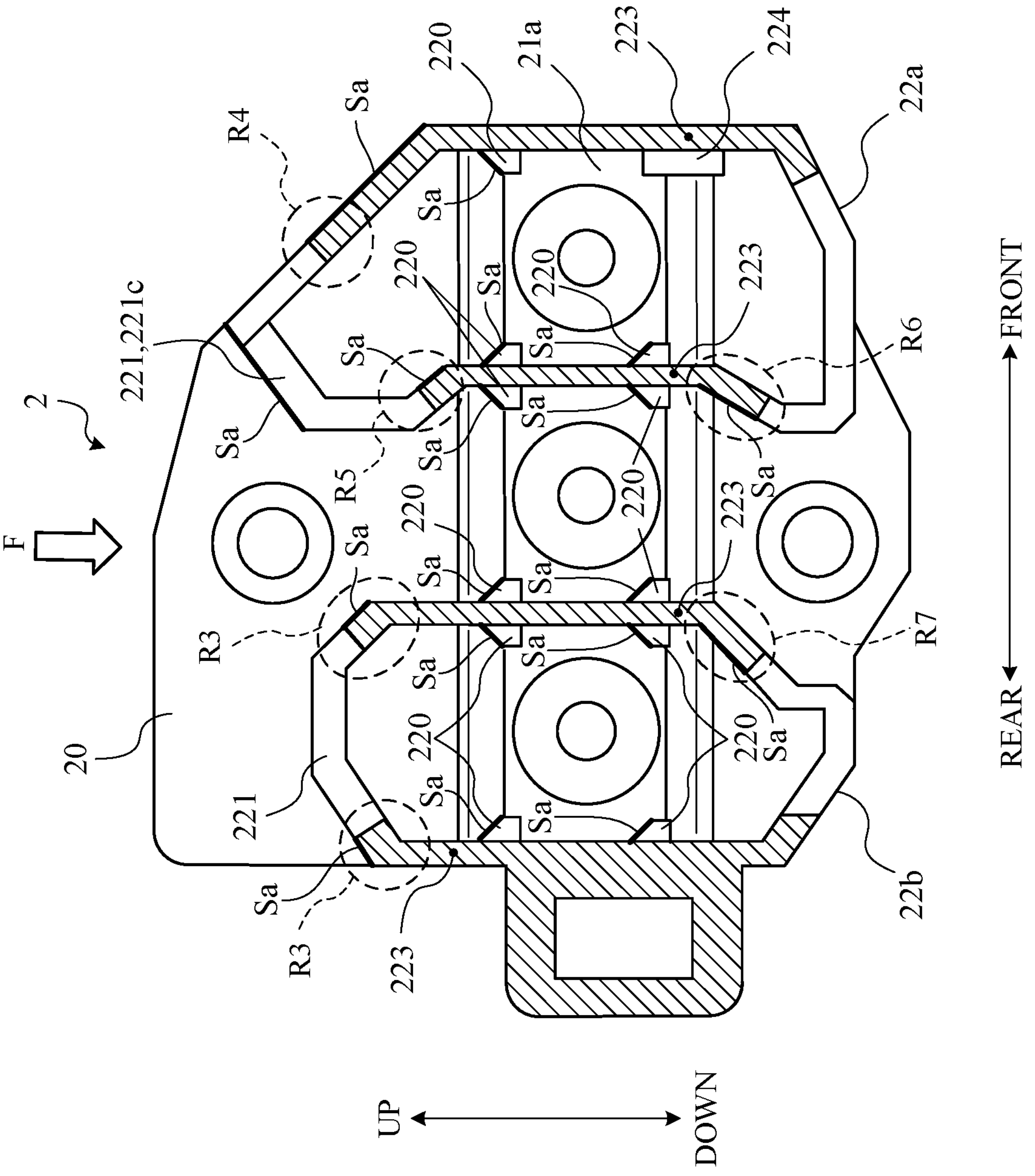
FIG. 11 is a view for explaining a coolant liquid deposition preventing function.

FIG. 11 is a view for explaining a coolant liquid deposition preventing function which is a fifth function of the wall portions 22*a* and 22*b*. When the coolant liquid introduced from the coolant introduction port 111 (FIG. 1) is erroneously mixed into the ATF, the ATF mixed with the coolant liquid enters the arrangement region of the terminal block in the transmission case 11 from the dropping pipe 122 (FIG. 1). The coolant liquid that has entered the arrangement region of the terminal block flows vertically downward as indicated by an arrow F in FIG. 11. When the coolant liquid is accumulated and deposited on the intermediate terminal block 2, particularly when the coolant liquid is deposited in a region close to the bus bars 3A and 3B, the coolant liquid is likely to cause a decrease in insulation quality. In consideration of this point, the upper wall surfaces (indicated by thick lines) of the wall portions 22*a* and 22*b* and the guide portion 220 are configured as inclined surfaces Sa inclined obliquely with respect to the horizontal. Accordingly, it is possible to reduce the deposition of the coolant liquid.

Specifically, in the partition wall portion 223, the wall surfaces of the regions R3 and R4 for preventing erroneous assembly of the bus bars 3A and 3B, the wall surfaces of the regions R5, R6, and R7 for preventing falling of the bus bars 3A and 3B, the wall surfaces of the guide portions 220 for guiding the bus bars 3A and 3B to the fixing portions 21*a*, 21*b*, and 21*c*, and the wall surfaces of the pull-out port 221 of the wall portion 22*a* functioning as the support portion 221*a* are provided. These wall surfaces are upper wall surfaces in the vertical direction, and each wall surface is formed as the inclined surface Sa inclined obliquely with respect to the horizontal, so as to suppress deposition (accumulation) of the coolant liquid. Also in the erroneous assembly prevention portion 224 provided on the inner peripheral surface of the wall portion 22*a*, the upper wall surface may be configured by an inclined surface (an inclined surface sloped downward toward the rear side).

According to the present embodiment, the following functions and effects can be achieved.

(1) An intermediate terminal block 2 as a terminal block includes: a base portion 20 (base plate); a fixing portion 21*a* (first fixing portion) which is arranged on the base plate and to which a lower end portion of a bus bar 3A (first bus bar) is fixed; a wall portion 22*a* (first wall portion) which is erected on the base plate to sandwich the fixing portion 21*a* and forms an extension path of the bus bar 3A, particularly, a pair of front and rear partition wall portions 223 (first partition wall portions); a fixing portion 21*b* (second fixing portion) which is arranged on the base plate side by side with the fixing portion 21*a* and to which a lower end portion of a bus bar 3B (second bus bar) is fixed; and a wall portion 22*b* (second wall portion) which is erected on the base plate to sandwich the fixing portion 21*b* and form an extension path of the bus bar 3B, particularly, a pair of front and rear partition wall portions 223 (second partition wall portions) (FIG. 4). At least one of the pair of partition wall portions 223 of the fixing portion 21*a* has a region R4 (first interference region) preventing arrangement of the bus bar 3B to the fixing portion 21*a*, and at least one of the pair of partition wall portions 223 of the fixing portion 21*b* has a region R3 (second interference region) preventing arrangement of the bus bar 3A to the fixing portion 21*b* (FIG. 8). Accordingly, it is possible to prevent the bus bar 3A from being erroneously attached to the fixing portion 21*b* and the bus bar 3B from being erroneously attached to the fixing portion 21*a*. That is, it is possible to prevent erroneous assembly of the bus bars 3A and 3B.

(2) The partition wall portions 223 are configured of an electrically insulating material. The partition wall portion 223 of the fixing portion 21*a* is arranged apart from the bus bar 3A fixed to the fixing portion 21*a*, and a protrusion height from the base portion 20 is higher than a height of the bus bar 3A fixed to the fixing portion 21*a* (FIG. 7). The partition wall portion 223 of the fixing portion 21*b* is arranged apart from the bus bar 3B fixed to the fixing portion 21*b*, and a protrusion height from the base portion 20 is higher than a height of the bus bar 3B fixed to the fixing portion 21*b* (FIG. 7). Accordingly, the insulation distances to the bus bars 3A and 3B can be increased, and the occurrence of creeping discharge can be suppressed.

(3) At least one of opposing surfaces (a rear surface of the front partition wall portion 223 and a front surface of the rear partition wall portion 223), which face each other, of the pair of front and rear partition wall portions 223 of the fixing portion 21*a* is provided with a guide portion 220 (first guide protrusion) which abuts on the bus bar 3A to guide the bus bar 3A to a central position (predetermined fixing position) of the fixing portion 21*a* (FIGS. 10 and 11). At least one of opposing surfaces (a rear surface of the front partition wall portion 223 and a front surface of the rear partition wall portion 223), which face each other, of the pair of front and rear partition wall portions 223 of the fixing portion 21*b* is provided with a guide portion 220 (second guide protrusion) which abuts on the bus bar 3B to guide the bus bar 3B to (a predetermined fixing position) of the fixing portion 21*b* (FIGS. 10 and 11). Accordingly, the bus bars 3A and 3B can be easily arranged at the central positions of the fixing portions 21*a* and 21*b*, and the bus bars 3A and 3B can be easily fixed.

(4) The intermediate terminal block 2 is installed such that each of the extension path of the bus bar 3A and the extension path of the bus bar 3B extends in an up-down direction (FIG. 2). The partition wall portion 223 of the fixing portion 21*a* has a wall portion 223*a* (first wall portion) provided above the fixing portion 21*a* so as to intersect with the extension path (FIG. 9). The partition wall portion 223 of the fixing portion 21*c* has a wall portion 223*b* (second wall portion) protruding rearward toward the extension path below the fixing portion 21*c* (FIG. 9). Accordingly, the bus bars 3A and 3B can be prevented from falling, and the bus bars 3A and 3B are easily fixed.

(5) The wall portion 22*a* further includes a support portion 221*a* which is connected to the partition wall portion 223 of the fixing portion 21*a* and supports the bus bar 3A arranged in the fixing portion 21*a* in the extension path (FIG. 9). Accordingly, the bus bar 3A can be supported stably.

(6) The wall portions 22*a* and 22*b* have inclined surfaces Sa inclined obliquely downward (FIG. 11). Accordingly, it is possible to prevent deposition of a coolant liquid on the terminal portion 2.

In the above-described embodiment, the configuration of the terminal block was described using the intermediate terminal block 2 used for the traction motor unit 1 for vehicle traveling as an example, but the present invention can be applied to terminal blocks used for other equipment in the same manner. In the above-described embodiment, the base portion 20 of the intermediate terminal block 2 is attached to the vertical surface of the transmission case 11, which is the attachment target, but the bottom of the base plate may be attached to the horizontal or inclined surface of the attachment target.

The above embodiment can be combined as desired with one or more of the above modifications. The modifications can also be combined with one another.

According to the present invention, it is possible to prevent erroneous assembly of the bus bar.

Above, while the present invention has been described with reference to the preferred embodiments thereof, it will be understood, by those skilled in the art, that various changes and modifications may be made thereto without departing from the scope of the appended claims.

What is claimed is:

1. A terminal block that supports one end portion of each of a first bus bar and a second bus bar arranged side by side in a first direction over an entire length thereof, wherein the first bus bar and the second bus bar each extend in a second direction orthogonal to the first direction, and present mutually different bent shapes when viewed from a third direction orthogonal to the first direction and the second direction, the terminal block comprising:

a base plate;

a first fixing portion arranged on the base plate, to which an end portion of the first bus bar is fixed;

a first wall portion erected on the base plate and forming an extension path of the first bus bar;

a second fixing portion arranged on the base plate side by side with the first fixing portion, to which an end portion of the second bus bar is fixed; and a second wall portion erected on the base plate and forming an extension path of the second bus bar, wherein an end portion of the first wall portion along the extension path and an end portion of the second wall portion along the extension path present mutually different shapes when viewed from the third direction, the first wall portion has a first interference region preventing arrangement of the second bus bar to the first fixing portion, and the second wall portion has a second interference region preventing arrangement of the first bus bar to the second fixing portion.

2. The terminal block according to claim 1, wherein the first wall portion has a pair of first partition wall portions facing each other to sandwich the first fixing portion and forming the extension path, the second wall portion has a pair of second partition wall portions facing each other to sandwich the second fixing portion and forming the extension path, at least one of the pair of first partition wall portions has the first interference region, and at least one of the pair of second partition wall portions has the second interference region.

3. The terminal block according to claim 2, wherein the first wall portion and the second wall portion are configured of an electrically insulating material, the pair of first partition wall portions is arranged apart from the first bus bar fixed to the first fixing portion, and a protrusion height of the pair of first partition wall portions from the base plate is higher than a height of the first bus bar fixed to the first fixing portion, and the pair of second partition wall portions is arranged apart from the second bus bar fixed to the second fixing portion, and a protrusion height of the pair of second partition wall portions from the base plate is higher than a height of the second bus bar fixed to the second fixing portion.

4. The terminal block according to claim 2, wherein a first guide protrusion abutting on the first bus bar to guide the first bus bar to a predetermined fixing position of the first fixing portion is provided on opposing surfaces facing each other of the pair of first partition wall portions, and a second guide protrusion abutting on the second bus bar to guide the second bus bar to a predetermined fixing position of the second fixing portion is provided on opposing surfaces facing each other of the pair of second partition wall portions.

5. The terminal block according to claim 2, wherein the terminal block is installed such that each of the extension path of the first bus bar and the extension path of the second bus bar extends in a vertical direction, a first partition wall portion, among the pair of first partition wall portions, has a fall preventing portion provided above the first fixing portion so as to intersect with the extension path or protruding toward the extension path below the first fixing portion, and a second partition wall portion, among the pair of second partition wall portions, has a fall preventing portion provided above the second fixing portion so as to intersect with the extension path or protruding toward the extension path below the second fixing portion.

6. The terminal block according to claim 2, wherein the first wall portion further has a support portion connected to the pair of first partition wall portions and supporting the first bus bar arranged in the first fixing portion in the extension path.

7. The terminal block according to claim 1, wherein the terminal block is provided such that each of the extension path of the first bus bar and the extension path of the second bus bar extends in a vertical direction, and the first wall portion and the second wall portion have inclined surfaces inclined obliquely downward.

8. The terminal block according to claim 2, wherein the first wall portion is formed erected on the base plate so as to surround the first fixing portion, and the second wall portion is formed erected on the base plate so as to surround the second fixing portion, the extension path of the first bus bar is formed by cutting out a part excluding the pair of first partition wall portions of the first wall portion, and the extension path of the second bus bar is formed by cutting out a part excluding the pair of second partition wall portions of the second wall portion.

9. The terminal block according to claim 1, wherein the first wall portion has the first interference region at an end portion of the first wall portion along the extension path, and the second wall portion has the second interference region at an end portion of the second wall portion along the extension path.

10. The terminal block according to claim 2, wherein at least one of the pair of first partition wall portions has an erroneous assembly prevention portion protruding on an inner peripheral surface thereof toward the first fixing portion, the erroneous assembly prevention portion preventing arrangement of the second bus bar to the first fixing portion, and a terminal portion of the second bus bar has a protrusion formed thereon, the protrusion abutting on the erroneous assembly prevention portion.

* * * * *